US011981983B2

(12) United States Patent
Luo et al.

(10) Patent No.: US 11,981,983 B2
(45) Date of Patent: May 14, 2024

(54) COMPOSITE RARE EARTH ANISOTROPIC BONDED MAGNET AND A PREPARATION METHOD THEREOF

(71) Applicants: GRIREM ADVANCED MATERIALS CO., LTD., Beijing (CN); GRIREM HI-TECH CO., LTD., Langfang (CN)

(72) Inventors: Yang Luo, Beijing (CN); Zhongkai Wang, Beijing (CN); Yuanfei Yang, Beijing (CN); Zilong Wang, Beijing (CN); Dunbo Yu, Beijing (CN); Yifan Liao, Beijing (CN); Jiajun Xie, Beijing (CN); Zhou Hu, Beijing (CN)

(73) Assignees: GRIREM ADVANCED MATERIALS CO., LTD., Beijing (CN); GRIREM HI-TECH CO., LTD., Langfang (CN)

( * ) Notice: Subject to any disclaimer, the term of this patent is extended or adjusted under 35 U.S.C. 154(b) by 735 days.

(21) Appl. No.: 17/090,710

(22) Filed: Nov. 5, 2020

(65) Prior Publication Data

US 2021/0134499 A1 May 6, 2021

(30) Foreign Application Priority Data

Nov. 6, 2019 (CN) ......................... 201911076255.5

(51) Int. Cl.
*H01F 1/057* (2006.01)
*B22F 1/05* (2022.01)
(Continued)

(52) U.S. Cl.
CPC ............ *C22C 33/0257* (2013.01); *B22F 1/05* (2022.01); *B22F 1/065* (2022.01); *B22F 1/102* (2022.01);
(Continued)

(58) Field of Classification Search
CPC ......... H01F 1/059; H01F 1/057; H01F 1/0578
See application file for complete search history.

(56) References Cited

U.S. PATENT DOCUMENTS

| | | | | |
|---|---|---|---|---|
| 10,546,672 | B2 * | 1/2020 | Kato | H01F 1/0577 |
| 2019/0096550 | A1 * | 3/2019 | Kuniyoshi | H01F 41/0293 |

FOREIGN PATENT DOCUMENTS

| | | | |
|---|---|---|---|
| CN | 104031601 | A | 9/2014 |
| CN | 106952703 | * | 7/2017 |

(Continued)

OTHER PUBLICATIONS

AGC. Cytop Amorphous Fluoropolymer. Retrieved from: https://www.agcchem.com/products/high-performance-coatings/cytop/ on Sep. 7, 2023. Published in Jul. 2018 (Year: 2018).*

(Continued)

*Primary Examiner* — Matthew E. Hoban
(74) *Attorney, Agent, or Firm* — Westbridge IP LLC

(57) ABSTRACT

The invention discloses a composite rare earth anisotropic bonded magnet and a preparation method thereof. The composite rare earth anisotropic bonded magnet comprises a Nd—Fe—B magnetic powder, a Sm—Fe—N magnetic powder, a binder and an inorganic nano-dispersant. The preparation method comprises steps of preparing a Nd—Fe—B magnetic powder by a HDDR method, preparing a Sm—Fe—N magnetic powder by a powder metallurgy method, mixing the Nd—Fe—B magnetic powder, the Sm—Fe—N magnetic powder, the binder and the inorganic nano-dispersant at a specific ratio to finally obtain the composite rare earth anisotropic bonded magnet. The invention, by adding an inorganic nano-dispersant, enables the full dispersion of the fine Sm—Fe—N powder during the mixing process of the binder, the Nd—Fe—B magnetic powder and the Sm—Fe—N powder, and thus makes the
(Continued)

fine Sm—Fe—N powder and the binder evenly coated on the surface of the anisotropic Nd—Fe—B magnetic powder.

14 Claims, 2 Drawing Sheets

(51) Int. Cl.
*B22F 1/065* (2022.01)
*B22F 1/102* (2022.01)
*C22C 33/02* (2006.01)
*H01F 1/059* (2006.01)
*H01F 41/02* (2006.01)

(52) U.S. Cl.
CPC ........... *H01F 1/0578* (2013.01); *H01F 1/059* (2013.01); *H01F 41/0266* (2013.01); *B22F 2301/355* (2013.01); *B22F 2304/10* (2013.01)

(56) References Cited

FOREIGN PATENT DOCUMENTS

| | | | | |
|---|---|---|---|---|
| JP | 2000-034503 | | * | 2/2000 |
| JP | 2000034503 | A | | 2/2000 |
| JP | 2007035667 | A | | 2/2007 |
| JP | 2015029016 | | * | 2/2015 |
| JP | 20172160676 | | * | 11/2017 |

OTHER PUBLICATIONS

Sheridan. Anisotropic powder from sintered NdFeB magnets by the HDDR processing route. Journal of Magnetism and Magnetic Materials 324 (2012) 63-67 (Year: 2012).*

* cited by examiner

COMPOSITE RARE EARTH ANISOTROPIC BONDED MAGNET AND A PREPARATION METHOD THEREOF

CROSS-REFERENCE TO RELATED APPLICATION

This Application claims priority from CN201911076255.5 filed Nov. 6, 2019, the contents of which are incorporated herein in the entirety by reference.

TECHNICAL FIELD OF THE INVENTION

The invention relates to the technical field of magnetic materials, in particular to a composite rare earth anisotropic bonded magnet and a preparation method thereof.

BACKGROUND OF THE INVENTION

The magnetic powder used for bonded neodymium-iron-boron permanent magnet materials is mainly divided into two categories: isotropic and anisotropic magnetic powder. At present, the isotropic neodymium-iron-boron magnetic powder is prepared by the rapid melt quenching method, with the maximum magnetic energy product being 12-16 MGOe, and the thus prepared isotropic neodymium-iron-boron bonded magnet has a maximum magnetic energy product not exceeding 12 MGOe. In contrast, the anisotropic neodymium-iron-boron bonded magnetic powder is usually prepared by the HDDR method. Owning to the particularity of the microstructure, that is, the parallel arrangement of fine grains (200-500 nm) in the direction of [001] easy magnetization axis, makes the maximum magnetic energy product 2-3 times that of the isotropic bonded magnetic powder. Through the molding or injection molding process, high-performance anisotropic bonded magnets can be prepared, which is in line with the development trend of miniaturization, lightweight and precision of electrical devices.

During the magnet molding process, a single particle size range is not conducive to the increase of the density of the molded magnet. The best way is to mix a coarse powder with a certain proportion of fine powder at a reasonable ratio, so that the fine powder can be filled into the gap formed by the coarse powder, thereby increasing the pressed density of the magnet. The Nd—Fe—B magnetic powder prepared by the HDDR method is prepared through the process of hydrogen absorption-disproportionation-dehydrogenation-repolymerization, and the particle size of the thus obtained magnetic powder is between 50-200 microns. Owning to the high activity, the subsequent crushing will cause significant increase of the oxygen content and the decrease of the magnetic performance of the magnetic powder, making it difficult to prepare finer powder through crushing.

By adding anisotropic Sm—Fe—N magnetic powder with a finer particle size (1-12 microns), the density of the molded magnet can be effectively increased. Patent document ZL200410085531.1 discloses a bonded magnet composed of a R1 series d-HDDR coarse magnet powder containing less than 6 at % of Co and a R2 series fine magnet powder having specific average particle diameters at a specific mix ratio, and a resin as the binder, wherein both the surface of the R1 series d-HDDR coarse magnet powder and that of the R2 series fine magnet powder are covered by a surfactant. However, because the particle size of the R2 series fine magnet (Sm—Fe—N) is in the range of 1-10 microns, it is easy to agglomerate and not easy to disperse, which will inevitably have an adverse effect on the distribution uniformity of the fine magnet powder during the molding process and the comprehensive magnetic performance and density of the pressed magnet. The above patent document fails to describe how to overcome the problem of easily agglomerating.

SUMMARY OF THE INVENTION

To solve the above-mentioned problem(s), the invention provides a composite rare earth anisotropic bonded magnet and a preparation method thereof. The method, by adding an inorganic nano-dispersant, enables the full dispersion of the fine Sm—Fe—N powder during the mixing process of the binder, the Nd—Fe—B magnetic powder and the Sm—Fe—N powder, and thus makes the fine Sm—Fe—N powder and the binder evenly coated on the surface of the anisotropic Nd—Fe—B magnetic powder, which can further improve the comprehensive magnetic performance, density and microstructure homogeneity of the composite magnet.

In order to achieve the above objectives, the invention adopts the following solutions:

In the first aspect, the invention provides a composite rare earth anisotropic bonded magnet, comprising a Nd—Fe—B magnetic powder, a Sm—Fe—N magnetic powder, a binder and an inorganic nano-dispersant;

wherein, the content of the Sm—Fe—N magnetic powder is 5-30 wt. %, the content of the binder is 1-10 wt. %, the content of the inorganic nano-dispersant is 0.1-2 wt. %, and the balance is the Nd—Fe—B magnetic powder.

Further, the inorganic nano-dispersant is any one or more of $Al_2O_3$, $SiO_2$ or $TiO_2$, with a particle size of 30-100 nm.

Further, the circularity of the Nd—Fe—B magnetic powder is 0.6-0.8. the circularity of the Nd—Fe—B magnetic powder is 0.6-0.8.

Further, the Sm—Fe—N magnetic powder has an average particle size of 1-12 microns.

Further, the square degree of the anisotropic bonded magnet is greater than 30%.

Further, the surface of the Sm—Fe—N magnetic powder is coated with an F-containing organic substance.

Further, the F-containing organic substance is a fluorine-containing alkane or a fluorine-containing olefin.

The above is a detailed description of the composite rare earth anisotropic bonded magnet of the invention.

In the second aspect, the invention provides a preparation method of the composite rare earth anisotropic bonded magnet, comprising the following steps:

- preparing a Nd—Fe—B magnetic powder by a HDDR method;
- preparing a Sm—Fe—N magnetic powder by a powder metallurgy method;
- mixing the Nd—Fe—B magnetic powder, the Sm—Fe—N magnetic powder, the binder and the inorganic nano-dispersant at a specific ratio to prepare a mixed rubber powder;
- subjecting the mixed rubber powder to molding, injection, calendering or extrusion to obtain the composite rare earth anisotropic bonded magnet.

Further, the step of mixing the Nd—Fe—B magnetic powder, the Sm—Fe—N magnetic powder, the binder and the inorganic nano-dispersant at a specific ratio to obtain a mixed rubber powder comprises:

- dissolving the binder in an organic solvent to prepare a first organic solution;
- adding the inorganic nano-dispersant to the first organic solution to prepare a second organic solution;

adding the Sm—Fe—N magnetic powder to the second organic solution, and uniformly dispersing it with ultrasound to prepare a third organic solution;

adding the Nd—Fe—B magnetic powder to the third organic solution and fully stirring to completely volatilize the organic solvent in the third organic solution to obtain the mixed rubber powder.

Further, the step of preparing the Sm—Fe—N magnetic powder further comprises:

coating the surface of the Sm—Fe—N magnetic powder with an F-containing organic substance;

adding the Sm—Fe—N magnetic powder to an organic solution of the F-containing organic substance and fully stirring to prepare a fully stirred organic solution;

completely volatilizing the organic solvent in the fully stirred organic solution, rendering the F-containing organic substance coated on the surface of the Sm—Fe—N magnetic powder.

The above is a detailed description of the preparation method of the composite rare earth anisotropic bonded magnet of the invention.

In summary, the invention provides a composite rare earth anisotropic bonded magnet and a preparation method thereof. The composite rare earth anisotropic bonded magnet comprises a Nd—Fe—B magnetic powder, a Sm—Fe—N magnetic powder, a binder and an inorganic nano-dispersant. The preparation method comprises steps of preparing a Nd—Fe—B magnetic powder by a HDDR method, preparing a Sm—Fe—N magnetic powder by a powder metallurgy method, coating the surface of the Sm—Fe—N magnetic powder with an F-containing organic substance, mixing the Nd—Fe—B magnetic powder, the Sm—Fe—N magnetic powder with the surface coated with an F-containing organic substance, the binder and the inorganic nano-dispersant at a specific ratio to prepare a mixed rubber powder, and subjecting the mixed rubber powder to molding, injection, calendering or extrusion to obtain the composite rare earth anisotropic bonded magnet.

The above technical solutions of the invention has the following beneficial technical effects:

The invention, by adding an inorganic nano-dispersant, enables the full dispersion of the fine Sm—Fe—N powder, and thus makes the fine Sm—Fe—N powder and the binder evenly coated on the surface of the anisotropic Nd—Fe—B magnetic powder, which can further improve the comprehensive magnetic performance, density and microstructure homogeneity of the composite magnet.

DETAILED DESCRIPTION OF THE INVENTION

Figure 1:
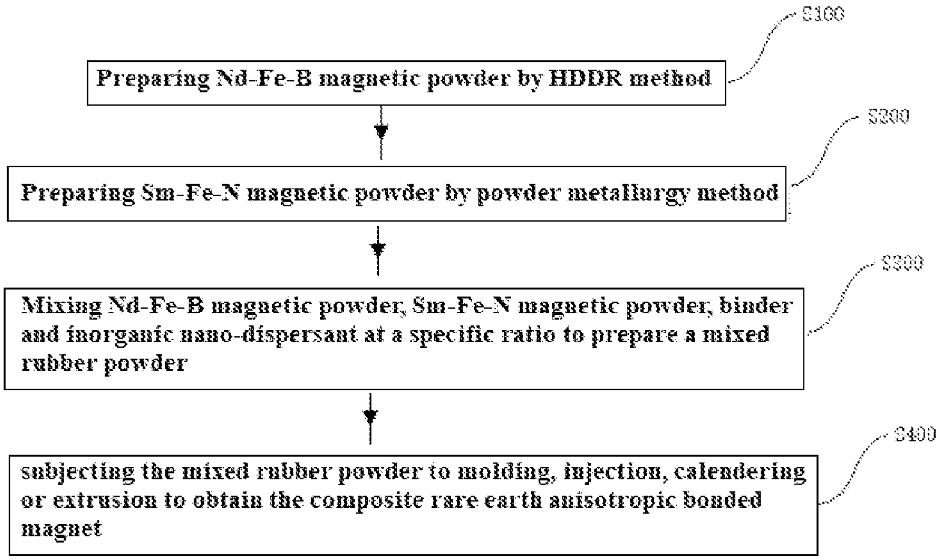
FIG. 1 is a flow diagram of the preparation method of composite rare earth anisotropic bonded magnets.

In order to make the objectives, technical solutions, and advantages of the invention clearer, the invention is further illustrated in detail below in conjunction with specific embodiments and with reference to the accompanying drawings. It should be understood that these descriptions are only exemplary and are not intended to limit the scope of the invention. In addition, in the following section, descriptions of well-known structures and technologies are omitted to avoid unnecessarily obscuring the concept of the invention.

Explanation of Term:

Calculation of Circularity:

A photograph of the magnetic powder is taken by SEM (scanning electron microscope) and analyzed to calculate the circularity.

The circularity is calculated according to the formula below:

$$\text{Circularity}=(4\pi*\text{area})/(\text{perimeter}*\text{perimeter})$$

Therefore, the circularity of the circle is 1; the closer the calculated circularity is to 1, the better the circularity is.

In order to achieve the above objectives, the invention adopts the following solutions:

In the first aspect, the invention provides a composite rare earth anisotropic bonded magnet, comprising a Nd—Fe—B magnetic powder, a Sm—Fe—N magnetic powder, a binder and an inorganic nano-dispersant; wherein, the content of the Sm—Fe—N magnetic powder is 5-30 wt. %, the content of the binder is 1-10 wt. %, the content of the inorganic nano-dispersant is 0.1-2 wt. %, and the balance is the Nd—Fe—B magnetic powder.

Further, the binder comprises a resin; the inorganic nano-dispersant is any one or more of $Al_2O_3$, $SiO_2$ or $TiO_2$, with a particle size of 30-100 nm; the circularity of the Nd—Fe—B magnetic powder is 0.6-0.8, the average particle size of the Sm—Fe—N magnetic powder is 1-12 microns, the square degree of the anisotropic bonded magnet is greater than 30%, and the surface of the Sm—Fe—N magnetic powder is coated with an F-containing organic substance.

Specifically, the F-containing organic substance is a fluorine-containing alkane or a fluorine-containing olefin.

When the circularity of the Nd—Fe—B magnetic powder is less than 0.6, the fluidity is poor, so that it is not easy to be compacted, resulting in poor performance; when the circularity is greater than 0.8, the fluidity of the large magnetic powder particles is too good to easily mix with the fine Sm—Fe—N powder homogeneously; therefore, the circularity of the Nd—Fe—B magnetic powder is 0.6-0.8.

The Sm—Fe—N magnetic powder within this range of particle size has strong activity and is easy to be oxidized. Therefore, it is necessary to coat an F-containing organic substance through surface treatment during the preparation process to improve the oxidation-resistance of Sm—Fe—N magnetic powder. The F organic substance may be a fluorine-containing alkane, a fluorine-containing olefin, and the like.

The Nd—Fe—B coarse magnetic powder, the Sm—Fe—N fine magnetic powder and the binder can prepare a bonded magnet with high pressed density. Nevertheless, as the particle size of the Sm—Fe—N fine magnetic powder is in the range of 1-12 microns, it is easy to agglomerate and difficult to disperse, which will inevitably have a negative influence on the distribution uniformity of the fine magnet powder in the process of forming the magnet, and then affect the comprehensive magnetic performance and compaction density of the magnet. Therefore, by adding an inorganic nano-dispersant, the Sm—Fe—N fine magnetic powder is fully dispersed, so that the Sm—Fe—N fine magnetic powder and the binder are uniformly coated on the surface of the anisotropic Nd—Fe—B coarse magnetic powder, which can further improve the comprehensive magnetic performance, density and microstructure homogeneity of the composite magnet.

In the second aspect, the invention provides a preparation method of the composite rare earth anisotropic bonded magnet, as shown in FIG. 1, comprising the following steps:

S100, preparing a Nd—Fe—B magnetic powder by a HDDR method;

S200, preparing a Sm—Fe—N magnetic powder by a powder metallurgy method;

S300, mixing the Nd—Fe—B magnetic powder, the Sm—Fe—N magnetic powder, the binder and the inorganic nano-dispersant at a specific ratio to prepare a mixed rubber powder;

subjecting the mixed rubber powder to molding, injection, calendering or extrusion to obtain the composite rare earth anisotropic bonded magnet.

Figure 2:
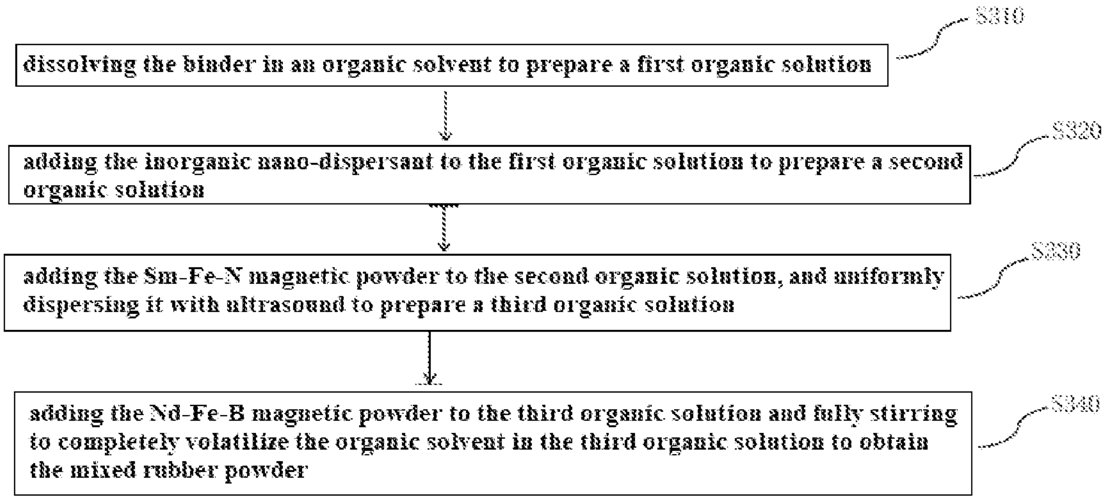
FIG. 2 is a flow diagram of the method of mixing the Nd—Fe—B magnetic powder, the Sm—Fe—N magnetic powder, the binder and the inorganic nano-dispersant at a specific ratio to make a mixed rubber powder.

Further, as shown in FIG. 2, the step of mixing the Nd—Fe—B magnetic powder, the Sm—Fe—N magnetic powder, the binder and the inorganic nano-dispersant at a specific ratio to prepare a mixed rubber powder comprises:

S310, dissolving the binder in an organic solvent to prepare a first organic solution;

S320, adding the inorganic nano-dispersant to the first organic solution to prepare a second organic solution;

S330, adding the Sm—Fe—N magnetic powder to the second organic solution, and uniformly dispersing it with ultrasound to prepare a third organic solution;

S340, adding the Nd—Fe—B magnetic powder to the third organic solution and fully stirring to completely volatilize the organic solvent in the third organic solution to obtain the mixed rubber powder.

Further, the organic solvent comprises acetone.

S400, subjecting the mixed rubber powder to molding, injection, calendering or extrusion to obtain the composite rare earth anisotropic bonded magnet.

Figure 3:
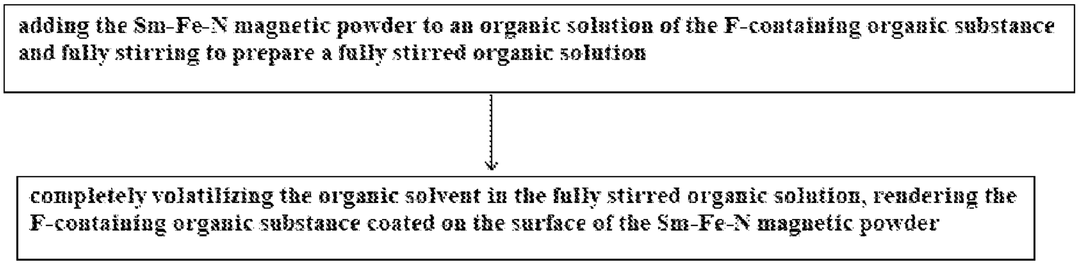
FIG. 3 is a flow diagram of the method of coating the surface of the Sm—Fe—N magnetic powder with an F-containing organic substance.

Further, the step of preparing the Sm—Fe—N magnetic powder further comprises coating the surface of the Sm—Fe—N magnetic powder with an F-containing organic substance, as shown in FIG. 3:

adding the Sm—Fe—N magnetic powder to an organic solution of the F-containing organic substance and fully stirring to prepare a fully stirred organic solution;

completely volatilizing the organic solvent in the fully stirred organic solution, rendering the F-containing organic substance coated on the surface of the Sm—Fe—N magnetic powder.

The invention will be described in detail below through specific examples.

The Nd—Fe—B magnetic powder was prepared by the HDDR method, with the maximum magnetic energy product of 38 MGOe, the intrinsic coercivity of 13.5 kOe, and the average particle diameter of 140 microns; the Sm—Fe—N magnetic powder was prepared by the powder metallurgy method, with the maximum magnetic energy product of 36 MGOe, the intrinsic coercivity of 11.0 kOe, and the average particle diameter of 3 microns; acetone was used as the organic solvent; and epoxy resin was used as the binder.

Example 1

According to the formulation of the ingredients, the binder epoxy resin, accounting for 3% of the total weight, was dissolved in the organic solvent acetone to obtain an organic solution A;

To the above-obtained organic solution A, an $Al_2O_3$ inorganic nano-dispersant, accounting for 0.1% of the total weight, with an average particle size of 30 nm, was added to obtain an organic solution A11;

A Sm—Fe—N magnetic powder, accounting for 20% of the total weight, was added to an organic solution B of an F-containing organic substance to obtain an organic solution B1 after fully stirring;

After the organic solvent in the organic solution B1 was completely volatilized, the F-containing organic substance was coated on the surface of the Sm—Fe—N magnetic powder;

The above-obtained Sm—Fe—N magnetic powder coated with an F-containing organic substance, accounting for 20% of the total weight, was added to the organic solution A121, to obtain an organic solution A12 after dispersing uniformly with ultrasound;

A Nd—Fe—B magnetic powder, accounting for 76.5% of the total weight, was added to the organic solution A12, and the organic solvent of the organic solution A12 was completely volatilized with fully stirring, to obtain a mixed rubber powder;

The above-obtained mixed rubber powder was prepared into an anisotropic bonded magnet by a molding method.

Example 2

According to the formulation of the ingredients, the binder epoxy resin, accounting for 3% of the total weight, was dissolved in the organic solvent acetone to obtain an organic solution A;

To the above-obtained organic solution A, an $Al_2O_3$ inorganic nano-dispersant, accounting for 0.5% of the total weight, with an average particle size of 30 nm, was added to obtain an organic solution A21;

A Sm—Fe—N magnetic powder, accounting for 20% of the total weight, was added to an organic solution B of an F-containing organic substance to obtain an organic solution B1 after fully stirring;

After the organic solvent in the organic solution B1 was completely volatilized, the F-containing organic substance was coated on the surface of the Sm—Fe—N magnetic powder; The above-obtained Sm—Fe—N magnetic powder coated with an F-containing organic substance, accounting for 20% of the total weight, was added to the organic solution A21, to obtain an organic solution A22 after dispersing uniformly with ultrasound;

A Nd—Fe—B magnetic powder, accounting for 76.5% of the total weight, was added to the organic solution A22, and the organic solvent of the organic solution A22 was completely volatilized with fully stirring, to obtain a mixed rubber powder;

The above-obtained mixed rubber powder was prepared into an anisotropic bonded magnet by a molding method.

Example 3

According to the formulation of the ingredients, the binder epoxy resin, accounting for 3% of the total weight, was dissolved in the organic solvent acetone to obtain an organic solution A;

To the above-obtained organic solution A, an $Al_2O_3$ inorganic nano-dispersant, accounting for 2% of the total weight, with an average particle size of 30 nm, was added to obtain an organic solution A31;

A Sm—Fe—N magnetic powder, accounting for 20% of the total weight, was added to an organic solution B of an F-containing organic substance to obtain an organic solution B1 after fully stirring;

After the organic solvent in the organic solution B1 was completely volatilized, the F-containing organic substance was coated on the surface of the Sm—Fe—N magnetic powder;

The above-obtained Sm—Fe—N magnetic powder coated with an F-containing organic substance, accounting for 20% of the total weight, was added to the organic solution A31, to obtain an organic solution A32 after dispersing uniformly with ultrasound;

A Nd—Fe—B magnetic powder, accounting for 76.5% of the total weight, was added to the organic solution A32, and the organic solvent of the organic solution A32 was completely volatilized with fully stirring, to obtain a mixed rubber powder;

The above-obtained mixed rubber powder was prepared into an anisotropic bonded magnet by a molding method.

Example 4

According to the formulation of the ingredients, the binder epoxy resin, accounting for 3% of the total weight, was dissolved in the organic solvent acetone to obtain an organic solution A; To the above-obtained organic solution A, an $SiO_2$ inorganic nano-dispersant, accounting for 0.1% of the total weight, with an average particle size of 100 nm, was added to obtain an organic solution A41;

A Sm—Fe—N magnetic powder, accounting for 20% of the total weight, was added to an organic solution B of an F-containing organic substance to obtain an organic solution B1 after fully stirring;

After the organic solvent in the organic solution B1 was completely volatilized, the F-containing organic substance was coated on the surface of the Sm—Fe—N magnetic powder;

The above-obtained Sm—Fe—N magnetic powder coated with an F-containing organic substance, accounting for 20% of the total weight, was added to the organic solution A41, to obtain an organic solution A42 after dispersing uniformly with ultrasound;

A Nd—Fe—B magnetic powder, accounting for 76.5% of the total weight, was added to the organic solution A42, and the organic solvent of the organic solution A42 was completely volatilized with fully stirring, to obtain a mixed rubber powder; The above-obtained mixed rubber powder was prepared into an anisotropic bonded magnet by a molding method.

Example 5

According to the formulation of the ingredients, the binder epoxy resin, accounting for 3% of the total weight, was dissolved in the organic solvent acetone to obtain an organic solution A;

To the above-obtained organic solution A, an $SiO_2$ inorganic nano-dispersant, accounting for 0.5% of the total weight, with an average particle size of 100 nm, was added to obtain an organic solution A51;

A Sm—Fe—N magnetic powder, accounting for 20% of the total weight, was added to an organic solution B of an F-containing organic substance to obtain an organic solution B1 after fully stirring;

After the organic solvent in the organic solution B1 was completely volatilized, the F-containing organic substance was coated on the surface of the Sm—Fe—N magnetic powder;

The above-obtained Sm—Fe—N magnetic powder coated with an F-containing organic substance, accounting for 20% of the total weight, was added to the organic solution A51, to obtain an organic solution A52 after dispersing uniformly with ultrasound;

A Nd—Fe—B magnetic powder, accounting for 76.5% of the total weight, was added to the organic solution A52, and the organic solvent of the organic solution A52 was completely volatilized with fully stirring, to obtain a mixed rubber powder;

The above-obtained mixed rubber powder was prepared into an anisotropic bonded magnet by a molding method.

Example 6

According to the formulation of the ingredients, the binder epoxy resin, accounting for 3% of the total weight, was dissolved in the organic solvent acetone to obtain an organic solution A;

To the above-obtained organic solution A, an $SiO_2$ inorganic nano-dispersant, accounting for 2% of the total weight, with an average particle size of 100 nm, was added to obtain an organic solution A61; A Sm—Fe—N magnetic powder, accounting for 20% of the total weight, was added to an organic solution B of an F-containing organic substance to obtain an organic solution B1 after fully stirring;

After the organic solvent in the organic solution B1 was completely volatilized, the F-containing organic substance was coated on the surface of the Sm—Fe—N magnetic powder;

The above-obtained Sm—Fe—N magnetic powder coated with an F-containing organic substance, accounting for 20% of the total weight, was added to the organic solution A61, to obtain an organic solution A62 after dispersing uniformly with ultrasound;

A Nd—Fe—B magnetic powder, accounting for 76.5% of the total weight, was added to the organic solution A62, and the organic solvent of the organic solution A62 was completely volatilized with fully stirring, to obtain a mixed rubber powder;

The above-obtained mixed rubber powder was prepared into an anisotropic bonded magnet by a molding method.

Example 7

According to the formulation of the ingredients, the binder epoxy resin, accounting for 3% of the total weight, was dissolved in the organic solvent acetone to obtain an organic solution A;

To the above-obtained organic solution A, a $TiO_2$ inorganic nano-dispersant, accounting for 0.1% of the total weight, with an average particle size of 50 nm, was added to obtain an organic solution A71;

A Sm—Fe—N magnetic powder, accounting for 20% of the total weight, was added to an organic solution B of an F-containing organic substance to obtain an organic solution B1 after fully stirring;

After the organic solvent in the organic solution B1 was completely volatilized, the F-containing organic substance was coated on the surface of the Sm—Fe—N magnetic powder;

The above-obtained Sm—Fe—N magnetic powder coated with an F-containing organic substance, accounting for 20% of the total weight, was added to the organic solution A71, to obtain an organic solution A72 after dispersing uniformly with ultrasound;

A Nd—Fe—B magnetic powder, accounting for 76.5% of the total weight, was added to the organic solution A72, and the organic solvent of the organic solution A72 was completely volatilized with fully stirring, to obtain a mixed rubber powder;

The above-obtained mixed rubber powder was prepared into an anisotropic bonded magnet by a molding method.

Example 8

According to the formulation of the ingredients, the binder epoxy resin, accounting for 3% of the total weight, was dissolved in the organic solvent acetone to obtain an organic solution A;

To the above-obtained organic solution A, a $TiO_2$ inorganic nano-dispersant, accounting for 0.5% of the total weight, with an average particle size of 50 nm, was added to obtain an organic solution A81;

A Sm—Fe—N magnetic powder, accounting for 20% of the total weight, was added to an organic solution B of an F-containing organic substance to obtain an organic solution B1 after fully stirring; After the organic solvent in the organic solution B1 was completely volatilized, the F-containing organic substance was coated on the surface of the Sm—Fe—N magnetic powder;

The above-obtained Sm—Fe—N magnetic powder coated with an F-containing organic substance, accounting for 20% of the total weight, was added to the organic solution A81, to obtain an organic solution A82 after dispersing uniformly with ultrasound;

A Nd—Fe—B magnetic powder, accounting for 76.5% of the total weight, was added to the organic solution A82, and the organic solvent of the organic solution A82 was completely volatilized with fully stirring, to obtain a mixed rubber powder;

The above-obtained mixed rubber powder was prepared into an anisotropic bonded magnet by a molding method.

Example 9

According to the formulation of the ingredients, the binder epoxy resin, accounting for 3% of the total weight, was dissolved in the organic solvent acetone to obtain an organic solution A; To the above-obtained organic solution A, an $TiO_2$ inorganic nano-dispersant, accounting for 2% of the total weight, with an average particle size of 50 nm, was added to obtain an organic solution A91;

A Sm—Fe—N magnetic powder, accounting for 20% of the total weight, was added to an organic solution B of an F-containing organic substance to obtain an organic solution B1 after fully stirring;

After the organic solvent in the organic solution B1 was completely volatilized, the F-containing organic substance was coated on the surface of the Sm—Fe—N magnetic powder;

The above-obtained Sm—Fe—N magnetic powder coated with an F-containing organic substance, accounting for 20% of the total weight, was added to the organic solution A91, to obtain an organic solution A92 after dispersing uniformly with ultrasound;

A Nd—Fe—B magnetic powder, accounting for 76.5% of the total weight, was added to the organic solution A92, and the organic solvent of the organic solution A92 was completely volatilized with fully stirring, to obtain a mixed rubber powder;

The above-obtained mixed rubber powder was prepared into an anisotropic bonded magnet by a molding method.

Comparative Example

As compared with the above examples, no inorganic nano-dispersant was added, and the other steps were exactly the same.

| | Inorganic nano-dispersant | | | Performance of the magnet | | | | |
|---|---|---|---|---|---|---|---|---|
| Example | Type | Particle size (nm) | Adding ratio | Remanence Br (kGs) | Intrinsic coercivity iHc (kOe) | Maximum magnetic energy product (BH) max (MGOe) | Square degree Q | Density (g/cm$^3$) |
| Example 1 | $Al_2O_3$ | 30 | 0.1% | 10.4 | 13.0 | 25.0 | 0.47 | 6.15 |
| Example 2 | $Al_2O_3$ | 30 | 0.5% | 10.6 | 13.0 | 26.6 | 0.50 | 6.30 |
| Example 3 | $Al_2O_3$ | 30 | 2% | 10.1 | 13.0 | 23.5 | 0.41 | 6.05 |
| Example 4 | $SiO_2$ | 100 | 0.1% | 10.2 | 13.0 | 25.1 | 0.45 | 6.14 |
| Example 5 | $SiO_2$ | 100 | 0.5% | 10.4 | 13.0 | 26.0 | 0.48 | 6.28 |
| Example 6 | $SiO_2$ | 100 | 2% | 10 | 13.0 | 22.8 | 0.41 | 6.05 |
| Example 7 | $TiO_2$ | 50 | 0.1% | 10.1 | 13.0 | 24.6 | 0.44 | 6.15 |
| Example 8 | $TiO_2$ | 50 | 0.5% | 10.3 | 13.0 | 25.6 | 0.47 | 6.27 |
| Example 9 | $TiO_2$ | 50 | 2% | 9.8 | 13.0 | 22.5 | 0.41 | 6.05 |
| Comparative Example | Not adding inorganic nano-dispersant | | | 9.7 | 13.0 | 22 | 0.40 | 6.0 |

It can be seen from the examples and comparative example that the addition of the inorganic nano-dispersant improves the remanence, maximum magnetic energy product, square degree and density of the magnet, with significant effect. The foregoing examples are merely listed for clear illustration, and are not intended to limit the embodiments of the invention. For those of ordinary skill in the art, other changes or modifications in different forms can be made on the basis of the above description. It is unnecessary and impossible to list all the embodiments here. The obvious changes or modifications derived from this are still within the protection scope created by the invention.

In summary, a composite rare earth anisotropic bonded magnet and a preparation method thereof are provided. The composite rare earth anisotropic bonded magnet comprises a Nd—Fe—B magnetic powder, a Sm—Fe—N magnetic powder, a binder and an inorganic nano-dispersant, wherein the binder comprises a resin. The preparation method comprises steps of preparing a Nd—Fe—B magnetic powder by a HDDR method, preparing a Sm—Fe—N magnetic powder by a powder metallurgy method, mixing the Nd—Fe—B magnetic powder, the Sm—Fe—N magnetic powder, the binder and the inorganic nano-dispersant at a specific ratio to finally obtain the composite rare earth anisotropic bonded magnet. The invention, by adding an inorganic nano-dispersant, enables the full dispersion of the fine Sm—Fe—N powder during the mixing process of the Nd—Fe—B magnetic powder, the Sm—Fe—N powder and the binder, and thus makes the fine Sm—Fe—N powder and the binder evenly coated on the surface of the anisotropic Nd—Fe—B magnetic powder, which can further improve the density and microstructure homogeneity of the composite magnet.

It should be understood that the foregoing specific embodiments of the invention are only used to exemplarily illustrate or explain the principle of the invention, and do not constitute any limitation to the invention. Therefore, any modifications, equivalent substitutions, improvements, and the like made without departing from the spirit and scope of the invention should be included in the protection scope of the invention. In addition, the appended claims of the invention are intended to cover all changes and modifications that fall within the scope and boundary of the appended claims, or equivalent forms of such scope and boundary.

What the claimed is:

1. A composite rare earth anisotropic bonded magnet, wherein it comprises a Nd—Fe—B magnetic powder, a Sm—Fe—N magnetic powder, a binder and an inorganic nano-dispersant;

wherein, the content of the Sm—Fe—N magnetic powder is 5-30 wt. %, the content of the binder is 1-10 wt. %, the content of the inorganic nano-dispersant is 0.1-2 wt. %, and the balance is the Nd—Fe—B magnetic powder, the circularity of the Nd—Fe—B magnetic powder is 0.6-0.8.

2. The composite rare earth anisotropic bonded magnet according to claim 1, wherein the inorganic nano-dispersant is any one or more of $Al_2O_3$, $SiO_2$ or $TiO_2$, with a particle size of 30-100 nm.

3. The composite rare earth anisotropic bonded magnet according to claim 1, wherein the Sm—Fe—N magnetic powder has an average particle size of 1-12 microns.

4. The composite rare earth anisotropic bonded magnet according to claim 3, wherein the square degree of the anisotropic bonded magnet is greater than 30%.

5. The composite rare earth anisotropic bonded magnet according to claim 4, wherein the surface of the Sm—Fe—N magnetic powder is coated with an F-containing organic substance.

6. The composite rare earth anisotropic bonded magnet according to claim 5, wherein the F-containing organic substance is a fluorine-containing alkane or a fluorine-containing olefin.

7. A preparation method of the composite rare earth anisotropic bonded magnet according to claim 1, wherein it comprises the following steps:

preparing a Nd—Fe—B magnetic powder by a HDDR method;

preparing a Sm—Fe—N magnetic powder by a powder metallurgy method;

mixing the Nd—Fe—B magnetic powder, the Sm—Fe—N magnetic powder, the binder and the inorganic nano-dispersant at a specific ratio to prepare a mixed rubber powder;

subjecting the mixed rubber powder to molding, injection, calendering or extrusion to obtain the composite rare earth anisotropic bonded magnet.

8. The method of claim 7, wherein the step of mixing the Nd—Fe—B magnetic powder, the Sm—Fe—N magnetic powder, the binder and the inorganic nano-dispersant at a specific ratio to obtain a mixed rubber powder comprises:

dissolving the binder in an organic solvent to prepare a first organic solution;

adding the inorganic nano-dispersant to the first organic solution to prepare a second organic solution;

adding the Sm—Fe—N magnetic powder to the second organic solution, and uniformly dispersing it with ultrasound to prepare a third organic solution;

adding the Nd—Fe—B magnetic powder to the third organic solution and fully stirring to completely volatilize the organic solvent in the third organic solution to obtain the mixed rubber powder.

9. The method according to claim 8, wherein the step of preparing the Sm—Fe—N magnetic powder further comprises:

coating the surface of the Sm—Fe—N magnetic powder with an F-containing organic substance;

adding the Sm—Fe—N magnetic powder to an organic solution of the F-containing organic substance and fully stirring to prepare a fully stirred organic solution;

completely volatilizing the organic solvent in the fully stirred organic solution, rendering the F-containing organic substance coated on the surface of the Sm—Fe—N magnetic powder.

10. The method according to claim 7, wherein the inorganic nano-dispersant is any one or more of $Al_2O_3$, $SiO_2$ or $TiO_2$, with a particle size of 30-100 nm.

11. The method according to claim 7, wherein the Sm—Fe—N magnetic powder has an average particle size of 1-12 microns.

12. The method according to claim 11, wherein the square degree of the anisotropic bonded magnet is greater than 30%.

13. The method according to claim 12, wherein the surface of the Sm—Fe—N magnetic powder is coated with an F-containing organic substance.

14. The method according to claim 13, wherein the F-containing organic substance is a fluorine-containing alkane or a fluorine-containing olefin.

* * * * *